United States Patent
DeHaan

(10) Patent No.: US 8,316,125 B2
(45) Date of Patent: Nov. 20, 2012

(54) METHODS AND SYSTEMS FOR AUTOMATED MIGRATION OF CLOUD PROCESSES TO EXTERNAL CLOUDS

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 12/551,459

(22) Filed: Aug. 31, 2009

(65) Prior Publication Data

US 2011/0055377 A1 Mar. 3, 2011

(51) Int. Cl.
*G06F 15/173* (2006.01)
(52) U.S. Cl. ......... 709/224; 709/226; 709/238; 717/100
(58) Field of Classification Search .................. 709/224, 709/226, 238, 230; 717/100
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,669,177 B2 * | 2/2010 | Gerber et al. | 717/100 |
| 7,949,752 B2 * | 5/2011 | Lange et al. | 709/226 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 * | 2/2007 | Phillips et al. | 709/238 |
| 2007/0226715 A1 | 9/2007 | Kimura et al. | |
| 2007/0283282 A1 | 12/2007 | Bonfiglio et al. | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Kyung H Shin
(74) *Attorney, Agent, or Firm* — Lowenstein Sandler PC

(57) ABSTRACT

A cloud management system can receive rules for altering the virtual machines based on demands on the virtual machines and/or computing resources supporting the virtual machines. The cloud management system can receive data from the internal monitoring agents and/or external monitoring agents and to determine when the conditions of the rules are met. Once the conditions are met, the cloud management system can migrate the virtual machines to an external cloud.

21 Claims, 4 Drawing Sheets

U.S. PATENT DOCUMENTS

| | | |
|---|---|---|
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1* | 2/2010 | Stienhans et al. ............ 709/226 |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris at al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris at al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris at al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris at al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris at al., "Systems and Methods for Aggregate Monitoring of Utilization Data for Vendor Products in Cloud Networks", U.S. Appl. No. 12/790,039, filed May 28, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods far Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.

* cited by examiner

METHODS AND SYSTEMS FOR AUTOMATED MIGRATION OF CLOUD PROCESSES TO EXTERNAL CLOUDS

FIELD

This invention relates generally to network computing, more particularly, to systems and methods for cloud computing related networks, services, and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Currently, when a requester acquires access to the cloud for a virtual machine, the virtual machine is assigned fixed computing resources. Typically, the cloud architecture does not consider changes in the demand and usage of the virtual machines. As such, the requester lacks the ability to flexibly request use of the computing resources based on the demand on and the usage of the virtual machines. Additionally, the virtual machine is limited to the computing resources contained in the cloud.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
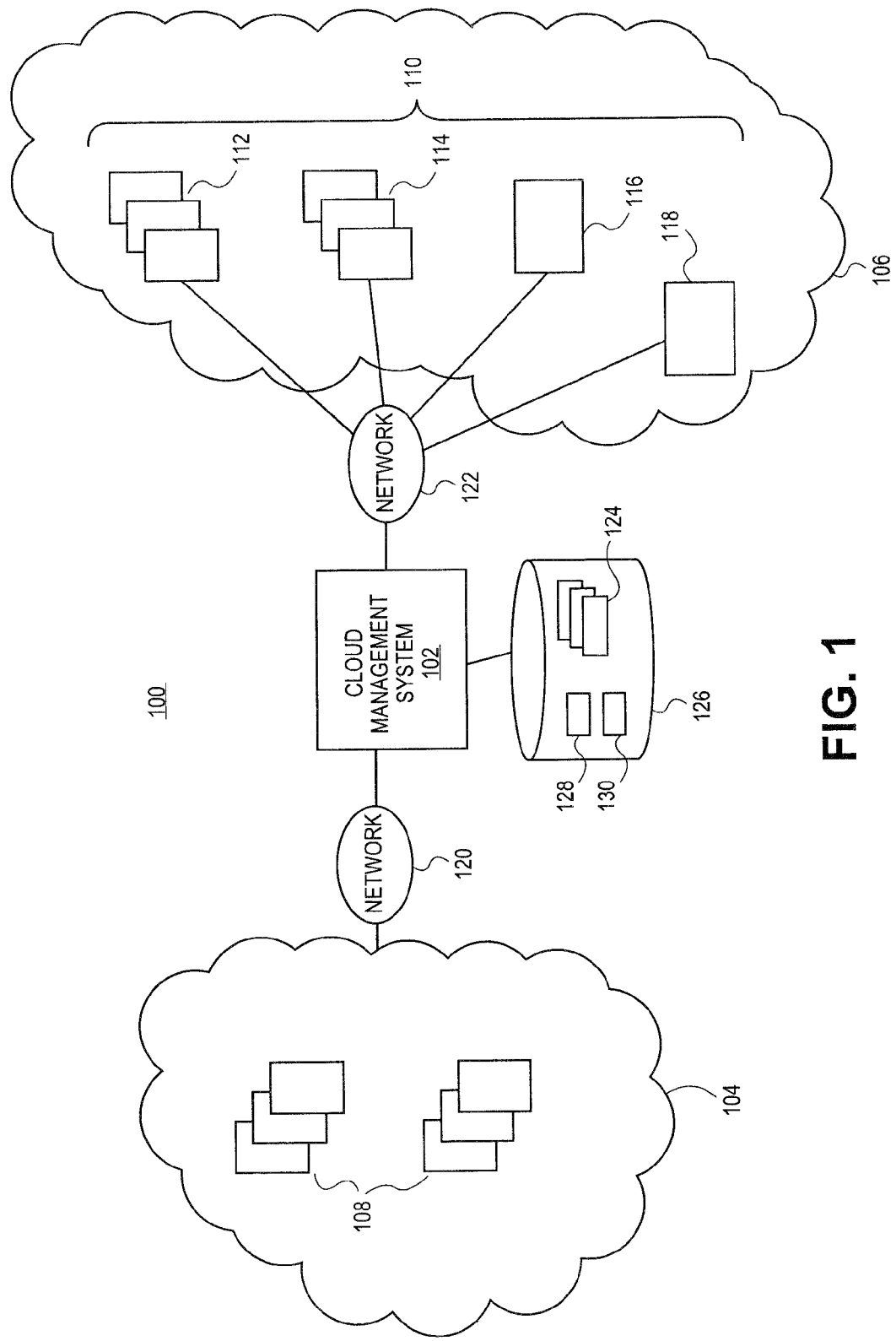
FIG. 1 illustrates an exemplary cloud computing architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for flexible management of a cloud computing environment. More particularly, embodiments relate to platforms and techniques in which a cloud management system can allow requesters to define rules to alter virtual machines such as migrating virtual machines to external clouds based on the demand on and usage of the cloud.

According to embodiments, the cloud management system can be configured to include a cloud master. The cloud master can be configured to provide an interface for the cloud management system or a requester to specify rules for altering the virtual machines based on demands on the virtual machines and/or computing resources supporting the virtual machines. The rules can specify conditions in usage of and demands on the instantiated virtual machines and/or the computing resources when the virtual machines should be altered. The alteration can include migrating the virtual machines to an external cloud once the usage of or demands on the virtual machines and/or computing resources meet the specified conditions.

According to embodiments, the cloud master can be configured to receive the rules in a universal format that can be utilized by the requesters. The cloud master can be configured to receive the rules in a natural text-based language. Additionally, the cloud master can receive rules via a variety of communication channels and protocols.

According to embodiments, the cloud master can also be configured to include application programming interfaces (APIs) to allow the rules to linked to internal monitoring agents and/or external monitoring agents. The internal monitoring agents can be tools and plug-ins provided by the cloud management system to monitor the usage of and the demands on the computing resources and/or the instantiated virtual machines. The external monitoring agents can be systems, tools, and plug-ins, separate for the cloud management system, to monitor the usage of and demands on the instantiated virtual machines and/or the computing resources.

According to embodiments, once the rules are received, the cloud master can be configured to receive data from the internal monitoring agents and/or external monitoring agents to determine when the conditions of the rules are met. Once the conditions are met, the cloud master can be configured to notify the cloud management system that the conditions are met and the action to be taken, for example, migrating the one or more virtual machines to an external cloud. Accordingly, the cloud management system can be configured to cooperate with an independent cloud management system of the external cloud in order to migrate the one or more virtual machines.

By allowing rules for altering virtual machines, the cloud management system can enable requesters to tailor their usage of the cloud in order to address changing conditions in the virtual machines. Additionally, by receiving the rules in a universal format, the cloud management system can extend cloud management processes to any type of requester. Moreover, because the cloud management system can migrate virtual machines to external clouds, the cloud management system can provide an expanded amount of computing resources to requesters. Thus, the cloud management system can provide flexibility and efficiency to any cloud computing environment.

FIG. 1 illustrates an overall cloud computing environment 100, in which systems and methods for the flexible management of the cloud computing environment 100, according to embodiments of the present teachings. According to embodiments, a cloud management system 102 can be configured to mange one or more clouds, such as a dedicated cloud 104 and an ad-hoc cloud 106. As used herein, a "cloud" can comprise a collection of computing resources that can be invoked to instantiate a virtual machine, process, or other resource for a limited or defined duration.

As shown for example in FIG. 1, the collection of computing resources supporting the dedicated cloud 104 can comprise a set of resource servers 108 configured to deliver computing resources and components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, in addition to supporting the dedicated cloud 104, the cloud management system 102 can be configured to support the ad-hoc cloud 106. The ad-hoc cloud 106 can be composed of a variety of computing resources that may not be dedicated to a cloud but can have available computing resources to contribute to the ad-hoc cloud 106. For example, a corporation or university can have a large number of computing resources that support a variety of process (email, websites, individual user computing, and the like). The corporation or university can utilize the available excess computing resources to support an ad-hoc cloud, such as ad-hoc cloud 106.

In embodiments, as shown in FIG. 1, the ad-hoc cloud 106 can be supported by a number of computing systems 110. For example, the computing systems 110 can include a variety of systems such as a set of servers 112 and 114 and standalone user computing systems 116 and 118. The computing systems 110 can include hardware resources, such as processors, memory, network hardware, storage devices, and the like, and software resources, such as operating systems (OS), application programs, and the like.

In embodiments, the entire set of resource servers 108 or other hardware or software resources used to support the cloud 104 and the computing systems 110 used to support the cloud 106 can be managed by the cloud management system 102. The cloud management system 102 can comprise a dedicated or centralized server and/or other software, hardware, and network tools that communicate via one or more networks 120 and networks 122, such as the Internet or other public or private network, with all sets of resource servers 108 to manage the cloud 104 and with computing systems 110 to manage the cloud 106 and their operation.

In embodiments, to manage the clouds 104 and 106, the cloud management system 102 can be configured identify the computing resources of the set of resource servers 108 and computing systems 110. The cloud management system 102 can be configured to include a network management agent that is capable of querying the set of resource servers 108 and computing systems 110 to determine the hardware and software resources. Likewise, the cloud management system 102 can be configured to communicate with external network management systems and/or resources monitoring agents executing on the set of resource servers 108 and computing systems 110 in order to determine the hardware and software resources of the set of resource servers 108 and computing systems 110.

In embodiments, the cloud management system 102 can be configured to identify both the hardware and software resources of the set of resource servers 108 and computing systems 110 and which of those resources are available for use in the cloud. The cloud management system 102 can be configured to identify the hardware resources such as type and amount of processing power, type and amount of memory, type and amount of storage, type and amount of network bandwidth and the like, of the set of resource servers 108 and computing systems 110. Likewise, the cloud management system can be configured to identify the software resources, such as type of OS, application programs, and the like, of the set of resource servers 108 and computing systems 110.

In embodiments, once the computing resources have been identified, the cloud management system 102 can be configured to store an identification of the available resources in an inventory 124 in a repository 126. The repository 126 can be any type of structure configured to store information, such as a database. The repository 126 can be maintained in a computer readable storage device or medium whether local to or remote from the cloud management system 102.

In embodiments, the inventory 124 can be configured to include information that identifies the set of resource servers 108 and computing systems 110 and information identifying the computing resources available. The sets of resource servers 108 and each system in the computing systems 110 can be identified by unique identifiers such as, for instance, Internet Protocol (IP) addresses or other addresses. In the inventory 124, the cloud management system 102 can associate, with each unique identifier, the computing resources available on that computing system.

In embodiments, to instantiate a new set of virtual machines, a requester can transmit an instantiation request to the cloud management system 102. The instantiation request can include the specifications for the set of virtual machines. The specifications can include the particular type of virtual machine they wish to invoke for their intended application. A requester can, for instance, make a request to instantiate a set of virtual machines configured for email, messaging or other applications from the cloud 104 and/or 106. The specifications can also include the type and/or amount of computing resources required. For example, the instantiation request can specify an amount of processing power or input/output (I/O) throughput the user wishes to be available to each instance of the virtual machine or other resources.

In embodiments, the requester's instantiation request can specify a variety of other specifications defining the configuration and operation of the set of virtual machines to be invoked. The instantiation request, for example, can specify a defined period of time for which the instantiated machine or process is needed. The period of time can be, for example, an hour, a day, or other increment of time. In embodiments, the requester's instantiation request can specify the instantiation of a set of virtual machines or processes on a task basis, rather than for a predetermined amount of time. For instance, a requester could request resources until a software update is completed. The requester can also, for instance, specify a service level agreement (SLA) acceptable for their application. One skilled in the art will realize that the requester's request can likewise include combinations of the foregoing exemplary specifications, and others.

In embodiments, the instantiation request can be received and processed by the cloud management system 102, which identifies the type of virtual machine, process, or other resource being requested from the specifications. The cloud management system 102 can then identify the collection of computing resources necessary to instantiate that machine or resource. For example, the set of instantiated virtual machines or other resources can for example comprise virtual transaction servers used to support Web storefronts, or other transaction sites.

In embodiments, the cloud management system 102 can be configured to utilize the specifications from the instantiation request and the inventory 124 of available computing resources to determine which cloud resources to devote to the requester's virtual machines to maximize the computing resources of the clouds 104 and/or 106 and meet the requester's specifications. For example, the cloud management system 102 can select a group of servers in the set of resource servers 108 and/or computing system in the computing systems 110 that match or best match the instantiation request for each component needed to build the virtual machine or other resource.

In embodiments, the cloud management system 102 can maintain a set of "virtual groups," and assign the set of resource servers 108 and computing systems 110 to different "virtual groups". The "virtual groups" can be based on the particular usage (type of virtual machine, application of the virtual machine, function of the virtual machine, and the like) of the members in the groups. For example, the cloud management system 102 can set up a "virtual group" for web servers. The cloud management system 102 can classify the computing resources for the web server "virtual group" based on which computing resources are best suited for web servers. As members of the web server "virtual group" request use of the cloud, the cloud management system 102 can assign the available computing resources classified in the web server "virtual group" to the members. Likewise, the "virtual groups" can be based on the specifications of the computing resources (type and amount of computing resources). For example, the cloud management system 102 can create a "virtual group" for high power computing users. The cloud management system 102 can assign resources to this group that can adequately support computing intensive virtual machines. As members of the high power "virtual group" request use of the cloud, the cloud management system 102 can assign the available computing resources classified in the high power "virtual group" to the members. The cloud management system 102 can maintain the virtual groups in a group record 128 in repository 126.

When the request to instantiate a set of virtual machines or other resources has been received and the necessary resources to build that machine or resource have been identified, the cloud management system 102 can communicate with one or more set of resource servers 108 and/or computing systems 110 to locate resources to supply the required components. The cloud management system 102 can select providers from the diverse set of resource servers 108 and/or computing systems 110 to assemble the various components needed to build the requested set of virtual machines or other resources. It may be noted that in some embodiments, permanent storage such as hard disk arrays may not be included or located within the set of resource servers 108 and the computing resources 110 available to the cloud management system 102, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the clouds 104 and 106 and hosted by third parties can be invoked by in-cloud virtual machines. For further example, other non-cloud hardware and/or storage services can be utilized as an extension to the clouds 104 and 106, either on an on-demand or subscribed or decided basis.

With the specification and resources identified, the cloud management system 102 can extract and build the set of virtual machines or other resources on a dynamic or on-demand basis. For example, one set of resource servers 108 or computing systems 110 can respond to an instantiation request for a given quantity of processor cycles with an offer to deliver that computational power immediately and guaranteed for the next hour. A further set of resource servers 108 or computing systems 110 can offer to immediately supply communication bandwidth, for example on a guaranteed minimum or best-efforts basis. In other embodiments, the set of virtual machines or other resources can be built on a batch basis or at a particular future time. For example, a set of resource servers 108 and/or computing systems 110 can respond to a request for instantiation at a programmed time with an offer to deliver the specified quantity of processor cycles within a specific amount of time, such as the next 12 hours.

In embodiments, the cloud management system 102 can then coordinate the integration of the completed group of servers from the set of resource servers 108 and/or computing systems from the computing systems 110, to build and launch the requested set of virtual machines or other resources. The cloud management system 102 can track the combined group of servers selected from the set of resource servers 108, computing systems from the computing systems 110, or other distributed resources that are dynamically or temporarily combined, to produce and manage the requested virtual machine population or other resources.

In embodiments, the cloud management system 102 can then set up and launch the initiation process for the virtual machines, processes, or other resources to be delivered from the cloud. The cloud management system 102 can for instance transmit an instantiation command or instruction to the group of servers in set of resource servers 108 and/or computing system in the computing systems 110. The cloud management system 102 can receive a confirmation message back from each participating server in a set of resource servers 108 and/or computing system in the computing systems 110 indicating a status regarding the provisioning of their respective resources. Various sets of resource servers can confirm, for example, the availability of a dedicated amount of processor cycles, amounts of electronic memory, communications bandwidth, or applications or other software prepared to be served.

In embodiments, the cloud management system 102 can maintain a VM record 130 of each virtual machine instantiated in the clouds 104 and 106. Each virtual machine can be assigned an instantiated machine ID that can be stored in the VM record 130, or other record or image of the instantiated population. Additionally, the cloud management system 102 can store the duration of each virtual machine and the collection of resources utilized by each virtual machine in the VM record 130 and/or inventory 124. The cloud management system 102 can maintain the VM record 130 in the repository 126.

In embodiments, the cloud management system 102 can further store, track and manage a requester's identity and associated set of rights or entitlements to software, hardware, and other resources. Each requester that populates a set of virtual machines in the cloud can have specific rights and resources assigned and made available to them. The cloud management system 102 can track and configure specific actions that a requester can perform, such as provision a set of virtual machines with software applications or other resources, configure a set of virtual machines to desired specifications, submit jobs to the set of virtual machines or other host, manage other requesters of the virtual machines or other resources, and other privileges or actions. The cloud management system 102 can further generate records of the usage of instantiated virtual machines to permit tracking, billing, and auditing of the services consumed by the requester. In embodiments, the cloud management system 102 can for example meter the usage and/or duration of the virtual machines, to generate subscription billing records for a requester that has launched those machines. Other billing or value arrangements are possible.

The cloud management system 102 can configure each virtual machine to be made available to requester and/or users of the one or more networks 120 and/or 122 via a browser interface, or other interface or mechanism. Each instantiated virtual machine can communicate with the cloud management system 102 and the underlying registered set of resource servers 108 and/or computing systems 110 via a standard Web application programming interface (API), or via other calls or interfaces. The instantiated virtual machines can likewise communicate with each other, as well as other sites, servers, locations, and resources available via the Internet or other public or private networks, whether within a given cloud 104 or 106 or between clouds.

It may be noted that while a browser interface or other front-end can be used to view and operate the instantiated virtual machines from a client or terminal, the processing, memory, communications, storage, and other hardware as well as software resources required to be combined to build the virtual machines or other resources are all hosted remotely in the clouds 104 and 106. In embodiments, the virtual machines or other resources may not depend on or require the requester's own on-premise hardware or other resources. In embodiments, a requester can therefore request and instantiate a set of virtual machines or other resources on a purely off-premise basis, for instance to build and launch a virtual storefront or other application.

Because the cloud management system 102 in one regard specifies, builds, operates and manages the virtual machines on a logical level, the requester can request and receive different sets of virtual machines and other resources on a real-time or near real-time basis, without a need to specify or install any particular hardware. The requester's virtual machines, processes, or other resources can be scaled up or down immediately or virtually immediately on an on-demand basis, if desired. In embodiments, the various sets of computing resources that are accessed by the cloud management system 102 to support the virtual machines or processes can change or be substituted, over time. The type and operating characteristics of the virtual machines can nevertheless remain constant or virtually constant, since instances are assembled from abstracted resources that can be selected and maintained from diverse sources based on uniform specifications.

In terms of network management of the virtual machines that have been successfully configured and instantiated, the cloud management system 102 can perform various network management tasks including security, maintenance, and metering for billing or subscription purposes. The cloud management system 102 of a given cloud 104 or 106 can, for example, install or terminate applications or appliances on individual machines. The cloud management system 102 can monitor operating virtual machines to detect any virus or other rogue process on individual machines, and for instance terminate the infected application or virtual machine. The cloud management system 102 can likewise manage the virtual machines or other resources on a collective basis, for instance, to push or deliver a software upgrade to all active virtual machines. Other management processes are possible. Likewise, the cloud management system 102 can be configured to communicate with external network management systems to coordinate the network management functions and processes.

In embodiments, more than one set of virtual machines can be instantiated in a given cloud at the same, overlapping or successive times. The cloud management system 102 can, in such implementations, build, launch and manage multiple sets of virtual machines based on the same or different underlying set of resource servers 108 or computing systems 110, with populations of different sets of virtual machines such as may be requested by different requesters. The cloud management system 102 can institute and enforce security protocols in the clouds 104 and 106 hosting multiple sets of virtual machines. Each of the individual sets of virtual machines can be hosted in a respective partition or sub-cloud of the resources of the clouds 104 and/or 106. The cloud management system 102 of a cloud can for example deploy services specific to isolated or defined sub-clouds, or isolate individual workloads/processes within the cloud to a specific sub-cloud. The subdivision of the clouds 104 and/or 106 into distinct transient sub-clouds or other sub-components which have assured security and isolation features can assist in establishing multiple requesters or a multi-tenant cloud arrangement. In a multiple requesters scenario, each of the multiple requesters can use the cloud platform as a common utility while retaining the assurance that their information is secure from other requesters of the overall cloud system. In further embodiments, sub-clouds can nevertheless be configured to share resources, if desired.

In embodiments, the instantiated virtual machines supported by the cloud 104 can also interact with instantiated virtual machines or processes generated in the cloud 106 or other clouds and vice versa. The cloud management system 102 of clouds 104 and 106 can interface with the cloud management system of other clouds, to coordinate those domains and operate the clouds and/or virtual machines or processes on a combined basis.

As described above, the cloud management system 102 can instantiate and manage the virtual machines instantiated in the clouds 104 and 106. In embodiments, the instantiation and management of virtual machines can be performed by virtual machine (VM) managers separate from the cloud management system 102. The cloud management system 102 can be configured to communicate with the separate VM managers in order to provide the VM managers with the computing resources available in the clouds 104 and 106. The cloud management system 102 can be configured to communicate and cooperate with the VM managers regardless of the virtualization scheme used by the VM managers.

In the foregoing and other embodiments, the requester making an instantiation request or otherwise accessing or utilizing the cloud network can be a person, customer, subscriber, administrator, corporation, organization, or other entity. In embodiments, the requester can be or include another virtual machine, application or process. In further embodiments, multiple requesters and/or entities can share the use of a set of virtual machines or other resources.

Figure 2:
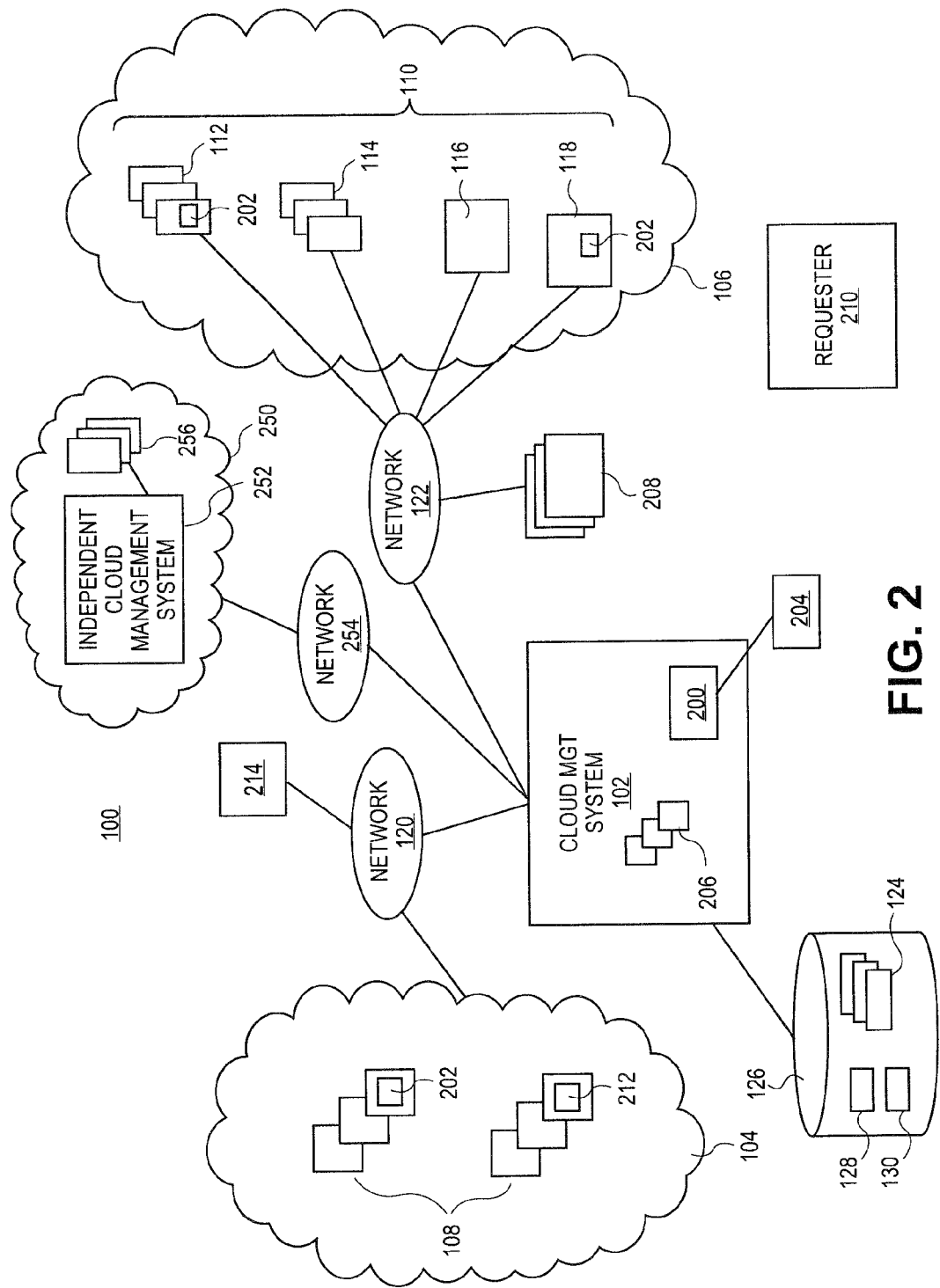
FIG. 2 illustrates the exemplary cloud computing architecture in which a cloud management system can utilize a cloud master and migrate virtual machines to external clouds, according to various embodiments.

FIG. 2 further illustrates aspects of the cloud computing environment 100 in which the cloud management system 102 can manage the dedicated cloud 104 and the ad-hoc cloud 106 utilizing a cloud master 200, according to various embodiments. While FIG. 2 only illustrates the interaction of cloud management system 102 with the dedicated cloud 104 and the ad-hoc cloud 106, one skilled in the art will realize that the cloud management system 102 can manage any number of clouds, for instance, only one of the dedicated cloud 104 and the ad-hoc cloud 106 or other clouds in addition to the dedicated cloud 104 and the ad-hoc cloud 106.

As shown in FIG. 2, the cloud management system 102 can be coupled to a network 120 to communicate with the set of resource servers 108 and coupled to the network 122 to communicate with computing systems 110 to provide management services for the dedicated cloud 104 and the ad-hoc cloud 106. As mentioned above, the dedicated cloud 104 can comprise a set of resource servers 108 configured to deliver computing resources and components needed to instantiate a virtual machine, process, or other resource. The ad-hoc cloud 106 can be composed of a variety of computing resources that may not be dedicated to a cloud but can have available computing resources to contribute to the ad-hoc cloud 106. For example, a corporation or university can have a large number of computing resources that support a variety of processes (email, websites, individual user computing, and the like). The corporation or university can utilize the available excess computing resources to support the ad-hoc cloud 106.

In embodiments, as shown in FIG. 2, the ad-hoc cloud 106 can be supported by the computing systems 110. For example, the computing systems 110 can include a variety of systems such as a set of servers 112 and 114 and standalone user computing systems 116 and 118. The computing systems 110 can include hardware resources, such as processors, memory, network hardware, storage devices, and the like, and software resources, such as operating systems (OS), application programs, and the like.

In embodiments, as described above in FIG. 1, the cloud management system 102 can be configured to instantiate virtual machines 202 in the dedicated cloud 104 and/or the ad-hoc cloud 106. The virtual machines 202 can be configured to perform a variety of processes, services, tasks, and the like. For example, the virtual machines 202 can be supporting the different components of a web site, e.g. webserver, database server, etc. When the virtual machines 202 are requested, the requesters can specify the computing resources required for the virtual machines 202. For instance, in the above web site example, the requester can specify hardware resources (an amount of bandwidth, processing power, memory, etc.) and software resources (types of web server application, database application, etc.) to support and comprise the virtual machines 202. The requester can specify these computing resources based on the expected usage of the computing resources supporting the virtual machines 202 (e.g. bandwidth to support expected traffic on the web site). The cloud management system 102 can be configured to identify and selected the set of resource servers 108 and/or the computing systems 110 that meet the requested computing resources and instantiate the virtual machines 202 on the selected set of resource servers 108 and/or the computing systems 110.

In embodiments, the demands on the virtual machines 202 instantiated in the dedicated cloud 104 and/or the ad-hoc cloud 106 can fluctuate over time. As such, the virtual machines' usage (increased or reduced) of the computing resources of the set of resource servers 108 and/or computing systems 110 can vary over time. For example, virtual machines 202 supporting a shopping website can experience a large increase in traffic during certain time periods, e.g. Christmas season. In some cases, the virtual machines 202 usage of the computing resources can reach the limits of the computing resources supporting them or significantly underutilize the computing resources. For example, virtual machines 202 supporting the shopping website can experience a large increase in traffic during the Christmas season and can reach the limit of the computing resources, for instance, network bandwidth, of the set of resource servers 108 and/or the computing systems 110 originally allocated for the website, thereby causes slow access to the shopping website. In contrast, immediately after Christmas, the virtual machines 202 supporting the shopping website can experience a sharp decrease in usage and have significant excess in computing resources.

In embodiments, to provide flexibility in the computing resources supporting the virtual machines 202, the cloud management system 102 can be configured to include the cloud master 200. The cloud master 200 can be configured to provide an interface 204 for the cloud management system 102 or requester to specify rules for altering the virtual machines 202 based on demands on the virtual machines and/or computing resources of the set of resource servers 108 and/or computing systems 110. In particular, the rules can specify conditions in usage of and demands on the instantiated virtual machines 202, the set of resource servers 108, and/or the computing systems 110 when the virtual machines 202 should be altered. Additionally, the rules can specify actions to take once the virtual machines 202 and/or computing resources meet the specified conditions. The actions can include altering the virtual machines 202 and/or operating state of the virtual machines 202, such as any adding new virtual machines 202, removing one or more of the virtual machines 202, adding computing resources to the virtual machines 202, removing computing resources from the virtual machines 202, migrating the virtual machines 202 to one or more of the set of resource servers 108, and/or the computing systems 110 with additional computing resources, migrating the virtual machines 202 to one or more of the set of resource servers 108, and/or the computing systems 110 with less computing resources, and the like.

In embodiments, the cloud master 200, via the interface 204, can be configured to receive the rules in a universal format that can be utilized by the requesters. For example, the cloud master 200 can be configured to receive the rules in a natural text-based language. Additionally, the cloud master 200, via the interface 204, can receive rules via a variety of communication channels and protocols. The interface 202 can be configured to supporting a scripting interface to allow the rules to be entered in the universal format. Likewise, the interface 202 can be configured to receive the rules in via other channels and protocols, such as electronic mail (email), simple network management protocol (SNMP), web service, message bus, and the like.

In embodiments, the cloud master 200 can also be configured to include application programming interfaces (APIs) to allow the rules to linked to internal monitoring agents 206 and/or external monitoring agents 208. The internal monitoring agents 206 can be tools and plug-ins provided by the cloud management system 102 to monitor the usage of and the demands on the set of resource servers 108, the computing systems 110, and/or the instantiated virtual machines 202. For example, the internal monitoring agents 206 can be conventional network monitoring tools, conventional computing resource monitoring tools, conventional virtual machine monitoring tools, and the like which have been modified to monitor the dedicated cloud 104, the ad-hoc cloud 106, and the instantiated virtual machines 202.

In embodiments, the external monitoring agents 208 can be systems, tools, and plug-ins, separate for the cloud management system 102, to monitor the usage of and demands on the instantiated virtual machines 202, the set of resource servers 108, and/or the computing systems 110. For example, the external monitoring agents 208 can be conventional network monitoring tools, conventional computing resource monitoring tools, conventional virtual machine monitoring tools, and the like.

In embodiments, once the rules are received, the cloud master 200 can be configured to receive data from the internal monitoring agents 204 and/or external monitoring agents 206 and to determine when the conditions of the rules are met. Once the conditions are met, the cloud master 200 can be configured to notify the cloud management system 102 that the conditions are met and the action to be taken. Accordingly, the cloud management system 102 can be configured to take the appropriate action to alter the instantiated virtual machines 202.

In embodiments, the cloud master 200 can be configured to include the necessary logic, routines, instruction, and commands to communicate with the cloud management system 102 and to provide the interface as described above. The cloud master 200 can be implemented as a portion of the code for the cloud management system 102. Likewise, the cloud master 200 can be implemented as a separate software tool accessible by the cloud management system 102. The cloud master 200 can be written in a variety of programming languages, such as JAVA, C++, Python code, and the like to accommodate a variety of operating systems, machine architectures, etc. Additionally, the cloud master 200 can be configured to include the appropriate APIs to communicate with and cooperate with other components of the cloud management system 102 and to provide the interface as described above.

In one example, a requester 210 can request and the cloud management system 102 can instantiate a virtual machine 212 in the dedicated cloud 104. The virtual machine 212 can be supporting the website "Political News" which provides news about national politics. When requesting the use of the cloud 104, the requester 212 can specify a particular computing resources requirement to meet the average expected traffic or wait time on the website. Accordingly, the cloud management system 102 can select the set of resource servers 108 to meet the computing resources requirements.

In this example, the requester 210 may know that "Political News" can experience a spike in traffic on the website at certain times, for instance, during election season or when a particular political news story occurs, which can cause an increase in wait time. To account for the expected spike in traffic, the requester 210 can desire to increase the computing resources or add new virtual machines supporting the website during these times. As such, the requester 210 can utilize the cloud master 200, via the interface 204, to create a rule to meet this expected spike. For example, the request 210 can specify a rule that states: when the traffic on "Political News" reaches a certain level, increase the bandwidth for the virtual machine 212. Using the universal format, the rule can take the form "—system virtual machine 212—wait time>2 seconds—increase computing resources".

Additionally, in this example, the requester 210 can specify the internal monitoring agent 206 and/or external monitoring agent 208 that will be monitoring the traffic or wait time on the website. For instance, the requester 210 can have access to an external monitoring agent 214 for monitoring traffic or wait time on a website. The requester 210 can utilize the interface 204 to specify, in the rule, the external monitoring agent 214 that will be monitoring the traffic or wait time on "Political News".

In this example, once the rule has been specified, the cloud master 200 can receive traffic or wait time data from the external monitoring agent 214 and determine if the traffic or wait time data meets the condition specified in the rule. If the wait time reaches 2 seconds, the cloud master 200 can notify the cloud management system 102 that the virtual machine 212 needs additional computing resources. Accordingly, the cloud management system 102 can take an appropriate action to alter the virtual machine 212.

In this example, to increase the computing resources, the cloud management system 102 can reconfigure the virtual machine 212 to utilize more of the computing resources of the set of resource servers 108. Likewise, the cloud management system 102 can migrate the virtual machine 212 to other of the set of resource servers 108 in the dedicated cloud 104 or migrate the virtual machine 212 to the computing systems 110 in the ad-hoc cloud 106. Likewise, the cloud management system 102 can add additional computing resources from the set of resource servers 108 and/or computing systems 110 to the virtual machine 212. In order to determine which of the set of resource servers 108 and/or computing systems 110 are available, the cloud management system 102 can examine the inventory 124.

The above example describes an exemplary situation for altering the virtual machine 212 upon the occurrence of a condition. One skilled in the art will realize that the requester 210 can specify any rules and conditions for altering the virtual machine 212 using the cloud master 200. For instance, the requester 210 can specify rules for decreasing the computer resources for the virtual machine 212 when traffic or wait time on the website decreases. Likewise, the requester 210 can specify any conditions related to the virtual machine 212 and the computing resources for altering the virtual machine 212. Additionally, the requester 210 can specify specific action to be taken (e.g. migrating the virtual machine 212).

In embodiments, the cloud master 200, via the interface 204, can be configured to receive instructions for alter virtual machines 202, immediately, instead of upon the occurrence of the condition. For example, the cloud master 200 can receive an instruction to immediately increase the computing resources, migrate the virtual machines 202 to one or more of the set of resource servers 108, and/or the computing systems 110 with additional computing resources, migrating the virtual machines 202 to one or more of the set of resource servers 108, and/or the computing systems 110 with less computing resources, and the like.

In embodiments, the cloud management system 102 can be configured to communicate with an external cloud 250 controlled by an independent cloud management system 252, via one or more networks 254. The external cloud 250 can be any type of cloud computing environment which is under the control of the independent cloud management system 252. The external cloud 250 can include its own computing resources 256 under the control of the independent cloud management system 252. For example, the external cloud 250 can be a commercially available cloud maintained by a provider, such as EC2 maintained by AMAZON, and/or cloud maintained by an separate and independent entity.

In embodiments, the one or more networks 254 can be or include the Internet, or other public or private networks. The one or more or more networks 254 can be or include wired, wireless, optical, and other network connections. One skilled in the art will realize that the one or more networks 254 can be any type of network, utilizing any type of communication protocol, to connect the computing systems.

In embodiments, as mentioned above, when the conditions of a particular rule are met, the cloud master 200 can be configured to notify the cloud management system 102. In response to the notification, the cloud management system 102 can be to take the appropriate or specified action, such as migrating one or more of the virtual machines. When migrating the virtual machines, the cloud management system 102 can be configured to migrate the virtual machines to the computing system 256 of the external cloud 250.

For example, as mentioned above, the requester 210 can utilize the cloud master 200, via the interface 204, to create a rule to meet an expected spike in traffic on the website "Political News". For example, the request 210 can specify a rule that states: when the traffic on "Political News" reaches a certain level, increase the bandwidth for the virtual machine 212. Using the universal format, the rule can take the form "—system virtual machine 212—wait time>2 seconds—increase computing resources". If the condition occurs, the cloud management system 102 may determine that the dedicated cloud 104 and the ad-hoc cloud 106 do not have the computing resources to meet the conditions specified in the rule. As such, the cloud management system 102 can be configured to migrate the virtual machine 212 to the external cloud 250, in order to supplement the computing resources provided and meet the conditions of the rule.

In embodiments, in order to migrate the virtual machines, the cloud management system 102 can be configured to communicate with the independent cloud management system 252 in order to determine the available computing resources 256 in the external cloud 250 and the configuration management scheme (e.g. virtualization scheme) utilized by the independent cloud management system 252 to instantiate and communicate with virtual machines. The cloud management system 102 can be configured to communicate with the independent cloud management system 252, periodically, and/or at the time the virtual machines need to be migrated to the external cloud 250. Likewise, once determined, the cloud management system 102 can be configured to store a record of the available computing resources 256 and the cloud management scheme in the inventory 124.

In embodiments, when migrating the virtual machines to the external cloud 250, the cloud management system 102 can directly instantiate the virtual machines on the computing resources 256 of the external cloud 250. For instance, the cloud management system 102 can communicate with the independent cloud management system 252 and the independent cloud management system 252 can provide the identification and information for the computing resources 256 that will support the virtual machines and the cloud management scheme utilized to instantiate virtual machines. Additionally, for instance, the cloud management system 102 can search the inventory 124 for the record of the available computing resources 256 and the cloud management scheme. As such, the cloud management system 102 can directly instantiate the virtual machines on the computing resources 256, as described above. Likewise, for example, the cloud management system 102 can provide the virtual machines and/or details of the virtual machines to the independent cloud management system 252, and the independent cloud management system 252 can instantiate the virtual machine.

Figure 3:
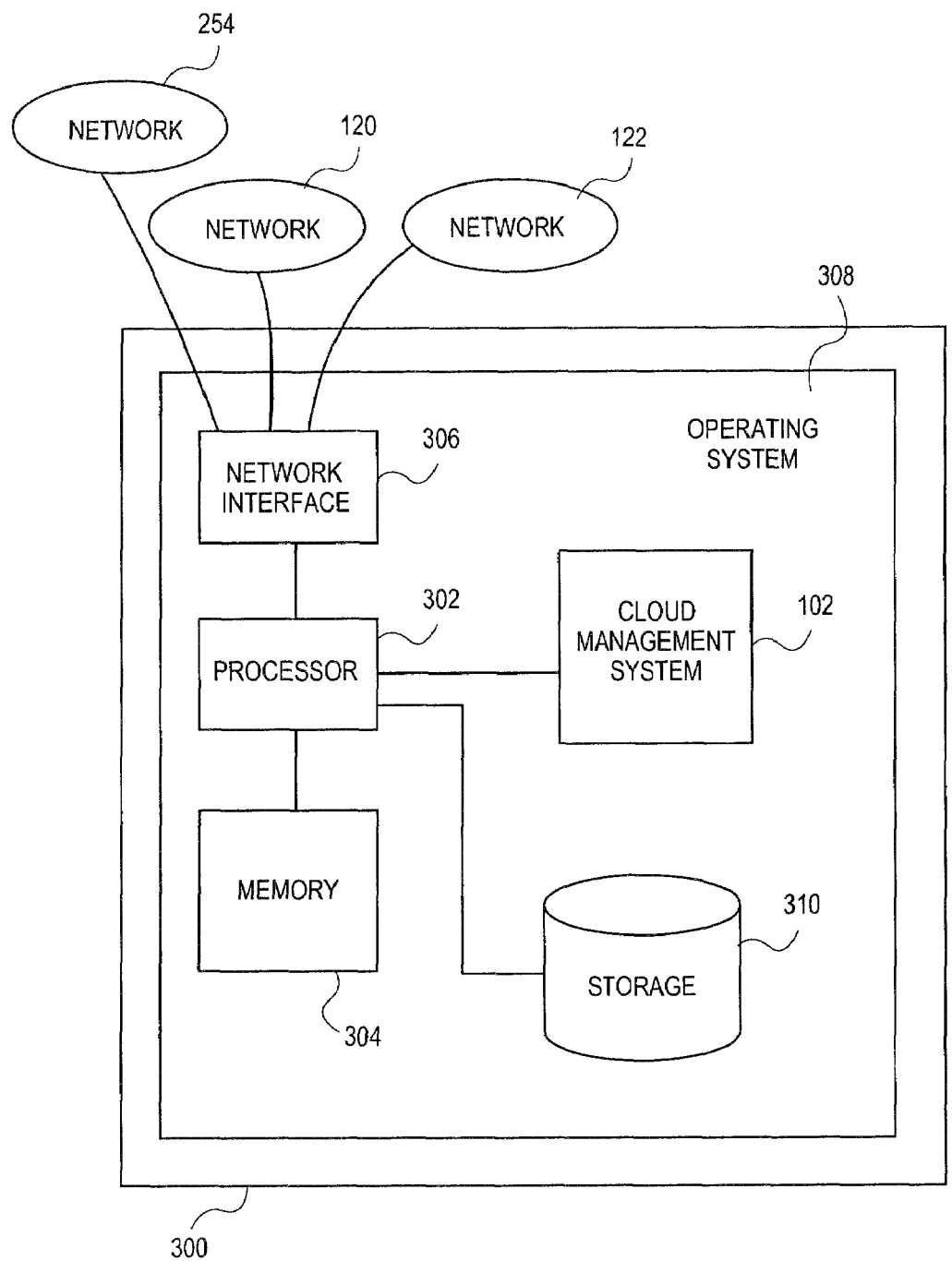
FIG. 3 illustrates an exemplary hardware configuration for a cloud management system, according to various embodiments.

FIG. 3 illustrates an exemplary diagram of hardware and other resources that can be incorporated in a computing system 300 and configured to communicate with the clouds 104 and 106 via one or more networks 120 and 122 and communicate with the external cloud 250 via the network 254, to support the cloud management system 102, according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, such as SELinux, the Unix™ operating system, or other open-source or proprietary operating system or platform. Processor 302 also communicates with one or more computer readable storage devices or media 310, such as hard drives, optical storage, and the like, for maintaining the repository 126. Processor 302 further communicates with network interface 306, such as an Ethernet or wireless data connection, which in turn communicates with one or more networks 120, 122, and 254, such as the Internet or other public or private networks.

Processor 302 also communicates with the cloud management system 102, to execute control logic and allow perform the management processes as described above and below. Other configurations of the computing system 300, associated network connections, and other hardware and software resources are possible.

While FIG. 3 illustrates the computing system 300 as a standalone system including a combination of hardware and software, the computing system 300 can include multiple systems operating in cooperation. The cloud management system 102 can be implemented as a software application or program capable of being executed by the computing system 300, as illustrated, or other conventional computer platforms. Likewise, the cloud management system 102 can also be implemented as a software module or program module capable of being incorporated in other software applications and programs. Further, the cloud management system 102 can also be implemented as a software module or program module capable of being incorporated in other management software applications and programs. In any example, the cloud management system 102 can be implemented in any type of conventional proprietary or open-source computer language. When implemented as a software application or program code, the cloud management system 102 can be stored in a computer readable storage medium, such as storage 310, accessible by the computing system 300. During execution, a copy of the cloud management system 102 can be stored in the memory 304.

Figure 4:
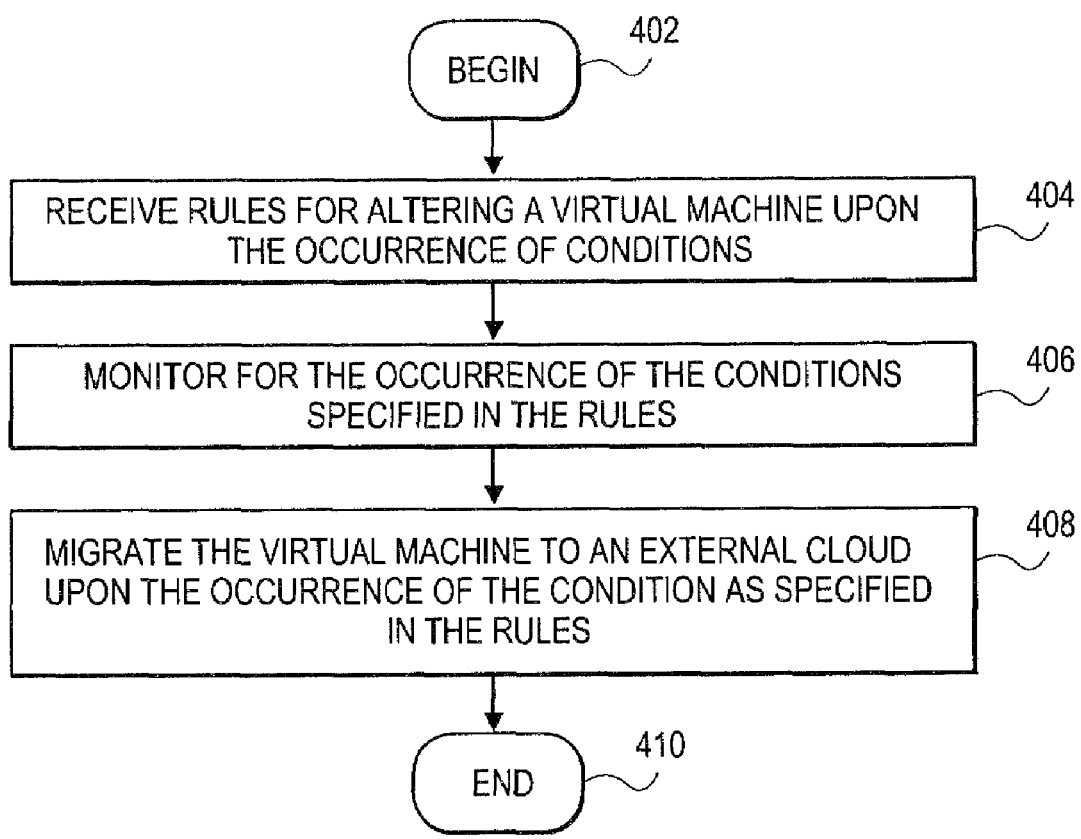
FIG. 4 illustrates a flowchart of an exemplary process for migrating virtual machines to external clouds, according to various embodiments.

FIG. 4 illustrates an exemplary flow diagram of a flexible management process for a cloud computing architecture including migrating virtual machines to external clouds, according to embodiments. In 402, processing can begin. In 404, the cloud management system 102 can be configured to receive rules for altering a virtual machine. For example, the cloud management system 102 can be configured to receive the rules via the interface 204 of the cloud master 200. The rules can specify conditions in usage of and demands on the instantiated virtual machines 202, the set of resource servers 108, and/or the computing systems 110. Additionally, the rules can specify actions to take once the virtual machines 202 and/or computing resources meet the specified conditions. The actions can include adding new virtual machines 202, removing one or more of the virtual machines 202, migrating the virtual machines 202 to one or more of the set of resource servers 108, and/or the computing systems 110 with additional computing resources, migrating the virtual machines 202 to one or more of the set of resource servers 108, and/or the computing systems 110 with less computing resources, and the like.

In 406, the cloud management system 102 can monitor for the occurrence of the conditions specified in the rules. For example, the cloud master 200, via the interface 204, can monitor for the occurrence of the condition. The cloud master 200 can be linked to internal monitoring agents 206 and/or external monitoring agent 208. The internal monitoring agents 206 can be tools and plug-ins provided by the cloud management system 102 to monitor the usage of and the demands on the set of resource servers 108, the computing systems 110, and/or the instantiated virtual machines 202.

In 408, the cloud management system 102 can migrate the virtual machine to an external cloud 250 upon the occurrence of the condition as specified in the rules. For example, the cloud management system 102 can directly instantiate the virtual machines on the computing resources 256 of the external cloud 250. For instance, the cloud management system 102 can communicate with the independent cloud management system 252 and the independent cloud management system 252 can provide the identification and information for the computing resources 256 that will support the virtual machines and the cloud management scheme utilized to instantiate virtual machines. Additionally, for instance, the cloud management system 102 can search the inventory 124 for the record of the available computing resources 256 and the cloud management scheme. As such, the cloud management system 102 can directly instantiate the virtual machines on the computing resources 256, as described above. Likewise, for example, the cloud management system 102 can provide the virtual machines and/or details of the virtual machines to the independent cloud management system 252, and the independent cloud management system 252 can instantiate the virtual machine.

Then, in 410, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
  instantiating, by a cloud management computing device that is managing a first cloud, a virtual machine on a computing device of the first cloud according to a request from a user;
  receiving, by the cloud management computing device, a rule defined by the user, wherein the rule specifies a condition that triggers a migration of the virtual machine;
  receiving, from the user, a specification of a monitoring agent to monitor the virtual machine;
  directing the monitoring agent to monitor for the occurrence of the condition;
  communicating with an independent cloud management computing device that manages a second cloud external to the first cloud to determine:
    available computing resources in the second cloud; and
    a configuration management scheme utilized by the independent cloud management computing device to instantiate and communicate with virtual machines on the second cloud; and
  when the monitoring agent determines that the monitored condition occurred, migrating, by the cloud management computing device, the virtual machine to another computing device of the second cloud based on the available computing resources in the second cloud and per the configuration management scheme utilized by the independent cloud management computing device.

2. The method of claim 1, wherein migrating the virtual machine to the another computing device of the second cloud, comprises:
  instantiating the virtual machine on the another computing device of the second cloud.

3. The method of claim 1, wherein migrating the virtual machine to the another computing device of the second cloud, comprises:
  providing the virtual machine or details of the virtual machine to the independent cloud management computing devices of the second cloud; and
  providing a request to the independent cloud management computing device to instantiate the virtual machine on the another computing device of the second cloud.

4. The method of claim 1, wherein the condition comprises at least one of demand on the virtual machine, usage of the virtual machine, demand on the computing system, and usage of the computing system.

5. The method of claim 1, wherein monitoring for the condition comprises receiving data indicating the occurrence of the condition.

6. The method of claim 1, further comprising:
  generating an interface to receive the rule.

7. The method of claim 1, wherein the rule is formatted in a text-based language.

8. A system comprising:
- a network interface to a set of computing devices in a first cloud and a second set of computing devices in a second cloud, wherein the first and second clouds are external to each other and managed by different cloud computing management devices;
- a memory containing instructions that implement a cloud management system in the cloud computing management device of the first cloud; and
- a processor communicatively connected with the network interface and the memory, the processor executing the instructions that implement the cloud management system, which is configured to perform operations comprising:
  - instantiating a virtual machine on the set of computing devices in the first cloud according to a request from a user;
  - receiving a rule defined by the user, wherein the rule specifies a condition that triggers a migration of the virtual machine;
  - receiving, from the user, a specification of a monitoring agent to monitor the virtual machine;
  - directing the monitoring agent to monitor for the occurrence of the condition;
  - communicating with an independent cloud management computing device that manages a second cloud external to the first cloud to determine:
    - available computing resources in the second cloud; and
    - a configuration management scheme utilized by the independent cloud management computing device to instantiate and communicate with virtual machines on the second cloud; and
  - when the monitoring agent determines that the monitored condition occurred, migrating the virtual machine to one of the computing devices in the second cloud based on the available computing resources in the second cloud and per the configuration management scheme utilized by the independent cloud management computing device.

9. The system of claim 8, wherein migrating the virtual machine to the one of the computing devices in the second cloud, comprises:
- instantiating the virtual machine on the one of the computing devices in the second cloud.

10. The system of claim 8, wherein migrating the virtual machine to the one of the computing devices in the second cloud, comprises:
- providing the virtual machine or details of the virtual machine to the independent cloud computing management device of the second cloud; and
- providing a request to the independent cloud computing management device of the second cloud to instantiate the virtual machine on the one of the computing devices in the second cloud.

11. The system of claim 8, wherein the condition comprises at least one of demand on the virtual machine, usage of the virtual machine, demand on the set of computing systems, and usage of the set of computing systems.

12. The system of claim 8, wherein monitoring for the condition comprises receiving data indicating the occurrence of the condition.

13. The system of claim 8, the cloud management system being further configured to—
- generate an interface to receive the rule.

14. The system of claim 8, wherein the rule is formatted in a text-based language.

15. A non-transitory computer readable storage medium comprising instructions for causing a processing system to perform a method comprising:
- instantiating, by a cloud management computing device that is managing a first cloud, a virtual machine on a computing device of the first cloud according to a request from a user;
- receiving, by the cloud management computing device, a rule defined by the user, wherein the rule specifies a condition that triggers a migration of the virtual machine;
- receiving, from the user, a specification of a monitoring agent to monitor the virtual machine;
- directing the monitoring agent to monitor for the occurrence of the condition;
- communicating with an independent cloud management computing device that manages a second cloud external to the first cloud to determine:
  - available computing resources in the second cloud; and
  - a configuration management scheme utilized by the independent cloud management computing device to instantiate and communicate with virtual machines on the second cloud; and
- when the monitoring agent determines that the monitored condition occurred, migrating, by the cloud management computing device, the virtual machine to another computing device in the second cloud based on the available computing resources in the second cloud and per the configuration management scheme utilized by the independent cloud management computing device.

16. The non-transitory computer readable storage medium of claim 15, wherein migrating the virtual machine to the another computing device of the second cloud, comprises:
- instantiating the virtual machine on the another computing device of the second cloud.

17. The non-transitory computer readable storage medium of claim 15, wherein migrating the virtual machine to the another computing device of the second cloud, comprises:
- providing the virtual machine or details of the virtual machine to the independent cloud management computing device of the second cloud; and
- providing a request to the independent cloud management computing device to instantiate the virtual machine on the another computing device of the second cloud.

18. The non-transitory computer readable storage medium of claim 15, wherein the condition comprises at least one of demand on the virtual machine, usage of the virtual machine, demand on the computing system, and usage of the computing system.

19. The non-transitory computer readable storage medium of claim 15, wherein monitoring for the condition comprises receiving data indicating the occurrence of the condition.

20. The non-transitory computer readable storage medium of claim 15, further comprising:
- generating an interface to receive the rule.

21. The non-transitory computer readable storage medium of claim 15, wherein the rule is formatted in a text-based language.

* * * * *